United States Patent
Dale

[11] 3,744,017
[45] July 3, 1973

[54] DIRECTIONAL HYDROPHONE

[75] Inventor: John C. Dale, Amherst, N.H.

[73] Assignee: Sanders Associates, Inc., Nashua, N.H.

[22] Filed: May 6, 1970

[21] Appl. No.: 34,945

[52] U.S. Cl. .................................. 340/8, 340/13
[51] Int. Cl. .......................................... H04b 13/00
[58] Field of Search ............... 340/13, 17, 10, 8, 340/3, 11

[56] References Cited
UNITED STATES PATENTS

| | | | |
|---|---|---|---|
| 3,417,369 | 12/1968 | Richard | 340/3 R |
| 3,500,302 | 3/1970 | Moss, Jr. et al | 340/3 R |
| 3,553,638 | 1/1971 | Sublett | 340/3 R |
| 3,550,072 | 12/1970 | Babikyan | 340/17 X |
| 3,157,852 | 11/1964 | Campbell et al | 340/17 |
| 2,988,728 | 6/1961 | Marlow | 340/10 |
| 3,067,404 | 12/1962 | Hildebrandt | 340/17 |

Primary Examiner—Benjamin A. Borchelt
Assistant Examiner—Harold Tudor
Attorney—Louis Etlinger

[57] ABSTRACT

A hydrophone for detecting low level sources of underwater pressure waves in the presence of ambient noise which includes a housing in which is mounted a magnetic structure having a radial air gap in which a sensing coil is resiliently mounted for axial movement and which hydrophone is mounted with the axis of the coil approximately vertical.

6 Claims, 7 Drawing Figures

INVENTOR
JOHN C. DALE

PATENTED JUL 3 1973 3,744,017

INVENTOR
JOHN C. DALE
BY

ATTORNEY

DIRECTIONAL HYDROPHONE

FIELD OF INVENTION

This invention relates generally to apparatus for detecting acoustic waves in the sea and particularly to such apparatus which favors the detection of waves generated by certain sources while discriminating against waves generated by other sources.

BACKGROUND

The art of detecting the presence and/or location of sources of underwater acoustic waves is an old one. Typically, a number of sonobuoys, each provided with one or more hydrophones, have been stationed in the area under surveillance. Each sonobuoy transmits the signals detected by the hydrophones to surface, air or shore based equipment which receives and analyzes them. Such arrangements are very useful and have been used extensively. However, when used to detect the presence of a submarine, where every effort is made to keep the noise generated to a minimum, it has been found that the range of reliable detection is limited to about 2 miles. This is because the acoustic waves transmitted by distant surface ships mask the waves generated by the nearer submarines.

PURPOSE OF THE INVENTION

It is a general object of the present invention to provide equipment which extends the range of reliable detection of sources of low level underwater acoustic waves beyond that heretofore attainable.

Another object is to provide equipment capable of detecting sources of underwater acoustic waves at low levels in the presence of ambient noise which has heretofore masked such waves.

BRIEF STATEMENT OF THE INVENTION

Briefly stated, the invention utilizes the discovery that almost all of the unwanted noise originating with distant surface ships arrives along paths which are approximately horizontal while the signals of interest, originating closer, arrive not only along paths which are approximately horizontal but also arrive along paths which are nearer vertical than horizontal. A preferred embodiment of the invention includes a hydrophone having directional characteristics which discriminate against pressure waves arriving along horizontal paths while favoring pressure waves arriving along vertical paths and paths having large vertical components.

For a clearer understanding of the invention, reference may be made to the following detailed description and accompanying drawing in which.

DESCRIPTION OF PREFERRED EMBODIMENT

Figure 1:
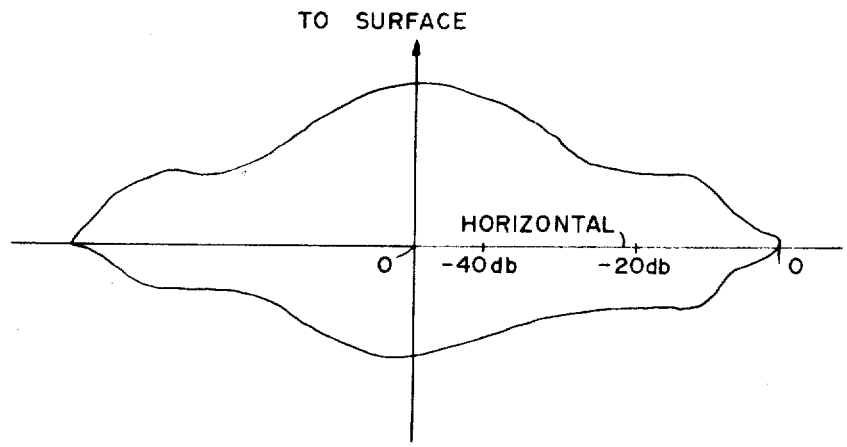
FIG. 1 is a diagram showing, in vertical profile, the relative strength of pressure waves travelling in different directions.

Referring first to FIG. 1, there is shown the relative intensity of ambient noise pressure waves of low frequency, that is, below about 1 khz, as a function of direction of arrival at a typical point 0 beneath the surface of the sea at a location where there is no nearby shipping. As shown, the intensity of pressure waves travelling to point 0 in an approximately horizontal direction is much greater than the intensity of similar waves travelling to point 0 in a vertical direction. It has been found that such vertical waves arriving at point 0 have an intensity on the order of 20 to 30 db less than similar waves arriving in an approximately horizontal direction.

Figure 2:
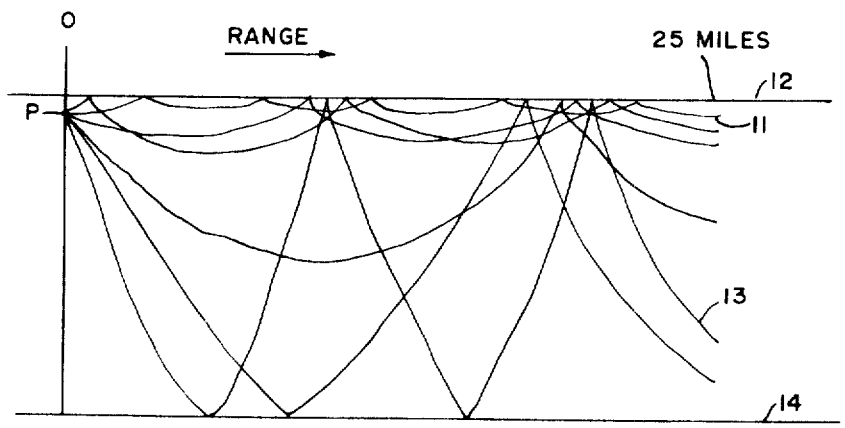
FIG. 2 is a diagram showing typical paths followed by pressure waves having a common source.

FIG. 2 shows various typical paths travelled by pressure waves originating at a point P just below the surface. The wave 11 starts approximately horizontally but is refracted by the water and is reflected from the surface 12 repeatedly. The wave 13 starts at an acute angle to the vertical, is refracted by the water, and is reflected repeatedly both from the bottom 14 and from the surface 12. It has been found, at a range of 25 miles or so from the source, that the intensity of nearly vertically travelling waves such as the wave 13 is on the order of 20 db less than that of approximately horizontally travelling waves such as the wave 11. Such a decrease in intensity of the wave 13 is believed to be caused both by the longer path travelled and to considerable absorption each time the wave strikes the bottom of the sea. Applicant takes advantage of the difference in intensities between waves such as the waves 11 and 13 by providing a hydrophone which discriminates against pressure waves travelling in an approximately horizontal direction and at the same time favors waves travelling in an approximately vertical direction. By the expression "horizontal waves" or "waves travelling in an approximately horizontal direction" is meant waves whose paths have a horizontal component which is much larger than their vertical component. Similarly, the expression "vertical waves" or "waves travelling in an approximately vertical direction" is meant to include waves whose paths have a much larger vertical component than they do a horizontal component.

Figure 3:
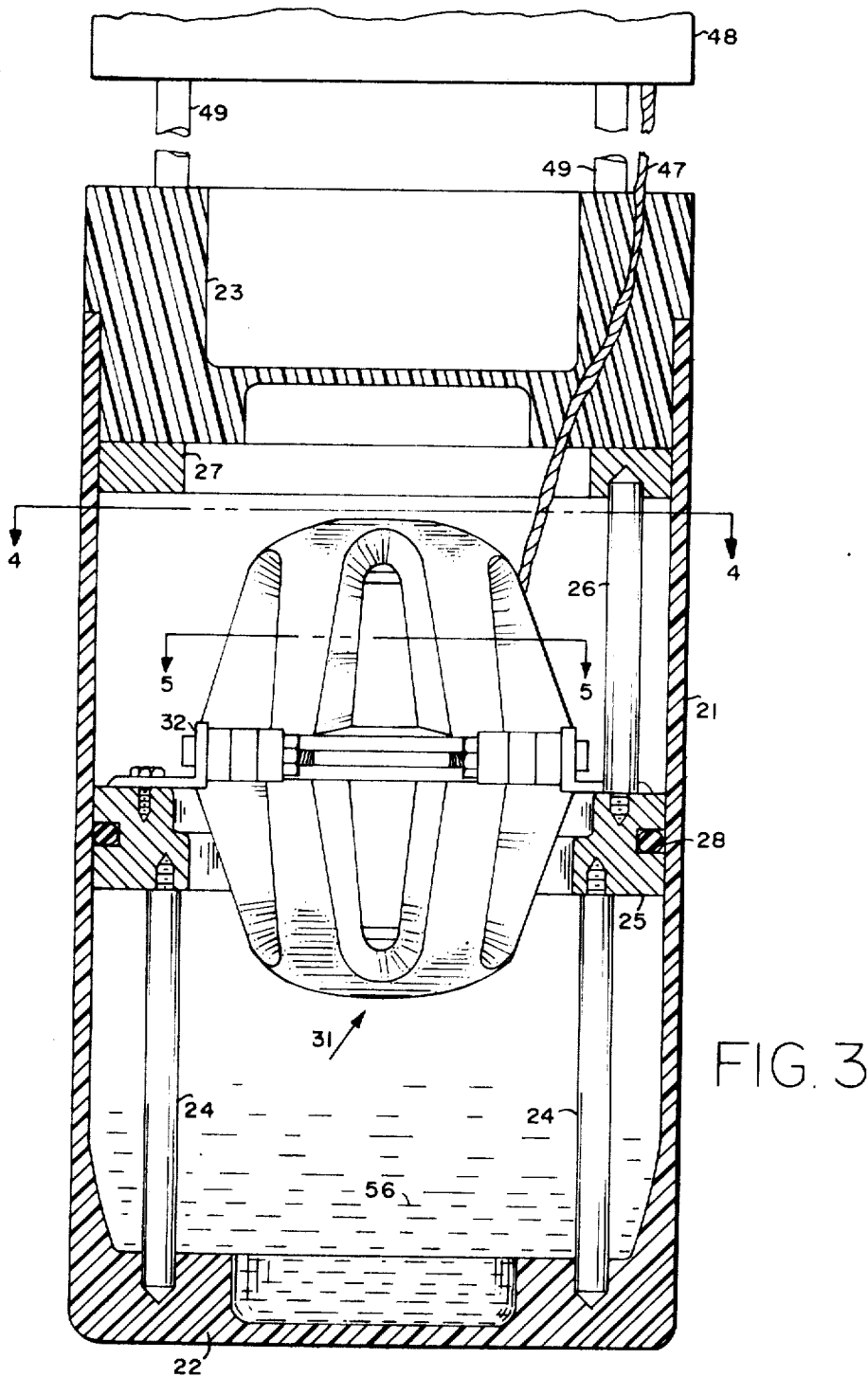
FIG. 3 is a schematic elevation view, partly in section, of a hydrophone incorporating the invention.
Figure 4:
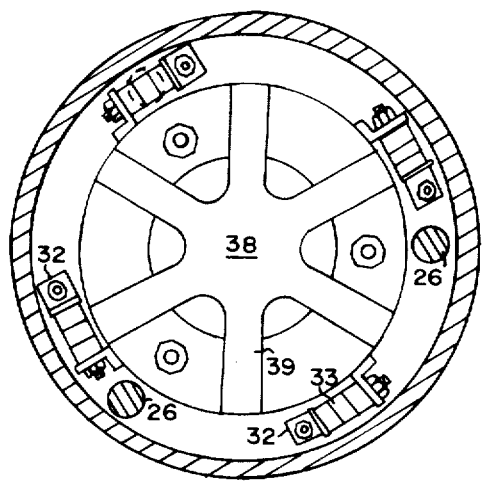
FIG. 4 is a cross section view taken on the line 4 — 4 of FIG. 3.

Referring now to FIGS. 3 and 4, there is shown a generally cylindrical housing 21 including a bottom portion 22 and a top portion or bulkhead 23, which portions close the ends of the housing. Three posts 24 are supported from the bottom portion 22 and extend upward and are fastened to a generally cylindrical supporting ring 25. Three additional posts extend from the supporting ring 25 to an auxiliary ring 27 adjacent to the top bulkhead 23. An O ring 28 assists the support 25 in lending stiffness to the housing 21. The hydrophone sensing unit, indicated generally by the reference character 31, is mounted to the support ring 25 by four mounting brackets 32 each of which includes a connecting portion 33 made of a resilient material.

Figure 5:
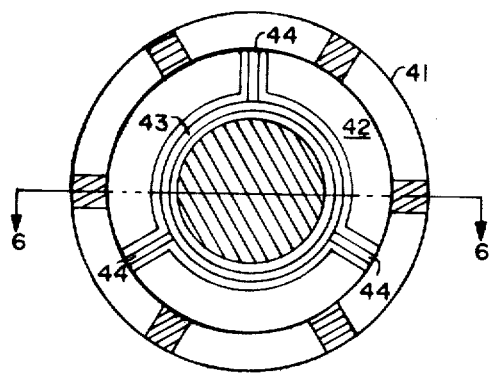
FIG. 5 is a schematic cross section, not to scale, taken on the line 5 — 5 of FIG. 3.
Figure 6:
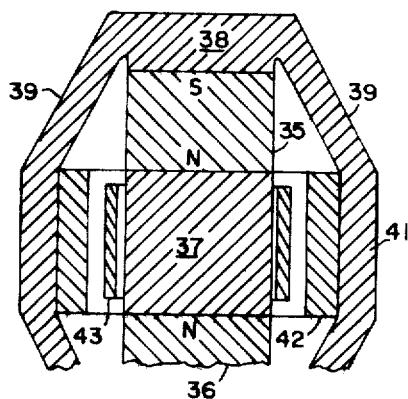
FIG. 6 is a schematic cross section, not to scale, taken along the line 6 — 6 of FIG. 5.
Figure 6:

As best shown (although not to scale) in FIGS. 5 and 6, the sensing unit includes a pair of permanent magnets 35 and 36 positioned along the axis of the device and oriented with like poles facing each other and both engaging a central pole piece 37 as shown in FIG. 6. The magnetic circuit includes an upper portion 38, a like portion on the bottom (not shown), and a plurality of magnetic arms 39 which interconnect the upper and lower portions. These arms 39 are formed integrally with a central ring portion 41. A smaller ring portion 42 is fitted inside the ring portion 41 and is spaced from the magnets 35 and 36 so as to define an air gap. A coil 43, comprising many turns of fine wire, is positioned within the air gap and is supported from the magnetic structure by means of three resilient support members 44 which extend through radial slots formed in the pole piece 42 and which are fastened to the central ring portion 41.

The two magnets 35 and 36, together with the just described magnetic structure, establish a unidirectional magnetic field across the air gap and through the coil 43. Axial movement of this coil relative to the magnetic structure will, of course, cause a signal to be generated. This signal is led by means of a cable 47 (FIG. 3) through the bulkhead 23 to an external equipment package 48. Typically this package which includes electronic equipment, suspends the housing 21 by means of one or more auxiliary cables 49 and in turn is suspended from the surface of the sea. The package 49 has been shown schematically only since the details thereof are well known and are not a part of the present invention. A liquid 56, such as oil, fills the interior of the housing 21 including all of the voids.

In operation, the entire hydrophone, including the housing 21 and everything inside it, is positioned beneath the surface of the water at the desired depth within the region under surveillance and held there in a substantially vertical position as shown in FIG. 3 by means of the cables 49 or by any other known means such as one of the arrangements shown in U.S. Pat. Nos. 3,262,090, 3,275,976 or 3,283,348 for example. Pressure waves travelling in a horizontal direction strike the housing 21 and their pressure differences are transmitted through the housing and through the liquid 56 to the vicinity of the coil 43. However, since the coil 43 is mounted for axial movement only, such horizontal waves have little or no effect. Vertical pressure waves are transmitted through the bottom portion 21, the top bulkhead 23 and the liquid 56 to the coil 43. The pressure differences of such waves cause the coil 43 to move axially while the massive magnetic structure tends to remain at rest due to its inertia. As a result, a signal is generated by the coil 43 and is transmitted through the cable 47 to the external package 48.

Figure 7:
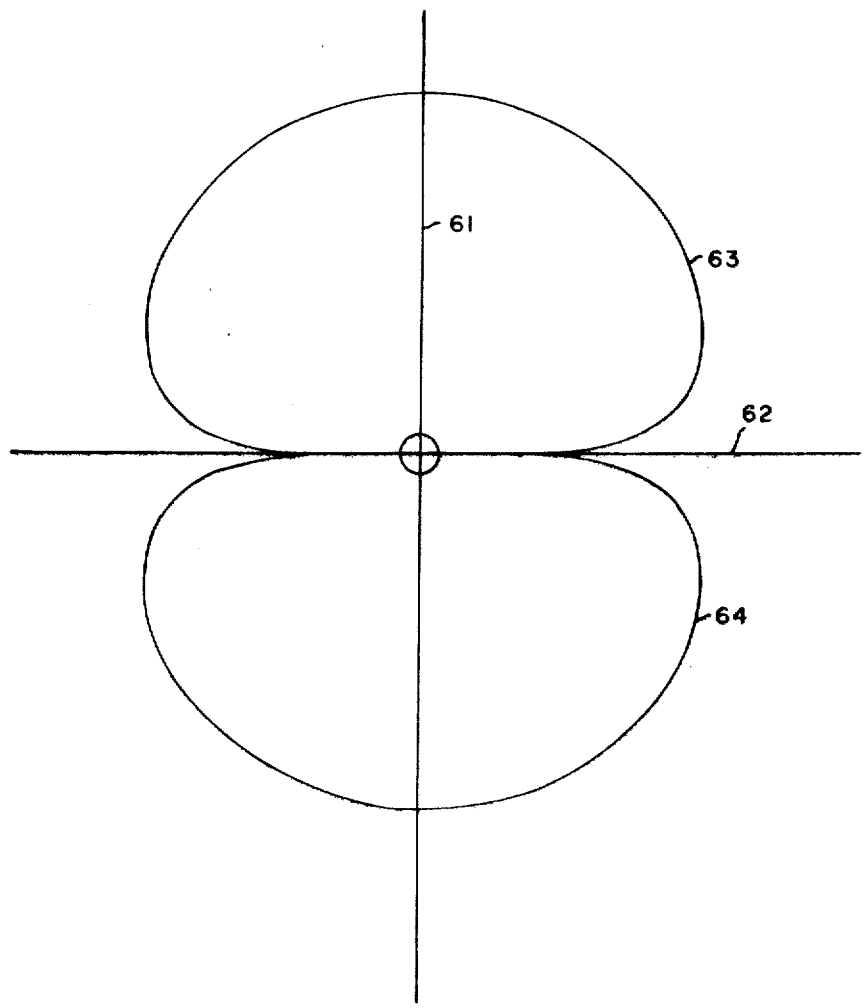
FIG. 7 is a diagram showing, in vertical profile, the directional sensitivity of a hydrophone in accordance with the present invention.

It has been found that a hydrophone constructed in accordance with FIGS. 3, 4, 5 and 6 exhibits a sensitivity in various directions as indicated by the graph of FIG. 7 wherein the line 61 represents the longitudinal axis of the device, that is, the axis of the coil 43, and wherein the line 62 represents the transverse axis, that is, the plane perpendicular to the vertical axis. The two curves 63 and 64 show that, relatively speaking, the device has great sensitivity to waves travelling parallel to the longitudinal axis 61 of the device while it has very little sensitivity to waves travelling parallel to the transverse axis 62 of the device. Accordingly, if the device be oriented in the water with the axis 61 approximately vertical and the plane 62 approximately horizontal, the device will have a very little sensitivity to waves travelling in an approximately horizontal direction while maximum sensitivity will be offered to waves having a large vertical component.

It has been found that a device constructed in accordance with the invention and positioned with the axis of its coil approximately vertical is capable of detecting low level pressure waves generated by submarines within a range of as much as 20 miles before such signals are masked by the noise generated by distant (greater than 20 miles) surface ships, while the best devices of this nature heretofore known to applicant were capable of detecting such submarines only up to a range of about 2 miles from the device itself.

Although a specific embodiment of applicant's invention has been described in considerable detail for illustrative purposes, many modifications will occur to those skilled in the art. It is therefore desired that the protection afforded by letters patent be limited only by the true scope of the appended claims.

What is claimed is:

1. Apparatus for detecting certain underwater pressure waves in the presence of ambient noise, comprising,
   a hydrophone for generating signals in response to incident pressure waves, said hydrophone comprising
   a housing,
   a magnetic structure, including a permanent magnet, mounted within said housing and defining a generally cylindrical air gap through which a unidirectional magnetic field extends radially,
   a coil within said air gap resiliently supported by said structure for axial movement relative thereto,
   a liquid filling the voids within said housing, and
   means for mounting said hydrophone in the region under surveillance with the cylindrical axis of said air gap approximately vertical,
   whereby pressure waves incident on said housing and having a vertical component are transmitted to said coil thereby moving said coil relative to said magnetic structure and generating a signal.

2. Apparatus according to claim 1 in which said housing is generally cylindrical in shape and in which said magnetic structure is mounted to make the axis of said air gap approximately parallel to the cylindrical axis of said housing.

3. Apparatus according to claim 1 in which said housing is generally cylindrical in shape and in which said magnetic structure is mounted to make the axis of said air gap approximately coincident with the cylindrical axis of said housing.

4. Apparatus according to claim 3 which includes a support ring centrally mounted adjacent to the interior cylindrical surface of said housing and in which said magnetic structure is mounted on said support ring.

5. Apparatus according to claim 4 in which said housing includes first and second end portions to which said support ring is mounted.

6. Apparatus according to claim 5 including a plurality of resilient elements by which said magnetic structure is mounted on said support ring.

* * * * *